United States Patent [19]
Dash

[11] 4,093,221
[45] June 6, 1978

[54] SIMULATED VIDEO GAME

[75] Inventor: Glen R. Dash, Watertown, Mass.

[73] Assignee: Massachusetts Institute of Technology, Cambridge, Mass.

[21] Appl. No.: 750,055

[22] Filed: Dec. 13, 1976

[51] Int. Cl.² .......................... A63F 7/06; G08B 5/22; H04N 7/18
[52] U.S. Cl. .......................... 273/85 G; 273/DIG. 28; 340/324 AD
[58] Field of Search .................. 35/11 R, 11 A, 12 N, 35/11, 12; 273/1 E, 85 R, 86 B, 102.2 R, 102.2 B, 94, DIG. 28, 1, 85, 86, 102.2; 340/323 R, 324 A, 324 AD, 323, 324; 358/93, 104, 142

[56] References Cited
U.S. PATENT DOCUMENTS

| | | | |
|---|---|---|---|
| 3,778,058 | 12/1973 | Rausch | 273/85 R |
| 3,809,395 | 5/1974 | Allison et al. | 273/1 E |
| 3,874,669 | 4/1975 | Ariano | 273/85 R |
| 4,006,474 | 2/1977 | Lukkarila | 273/DIG. 28 |

Primary Examiner—Vance Y. Hum
Attorney, Agent, or Firm—Arthur A. Smith, Jr.; Robert Shaw

[57] ABSTRACT

An electronic game wherein simulated players, a simulated object, a simulated playing field, and so forth, are produced electronically on the image screen of a television receiver by an electronic master controller, the players being caused to move about in both the $\pm x$ direction and the $\pm y$ direction by the electronic master controller under the control of human operators. Movement of the simulated object, spatial coincidence of the players and the object, and so forth, are all sensed and predetermined actions are taken on the image screen by virtue of signals from the electronic master controller to the television receiver.

49 Claims, 18 Drawing Figures

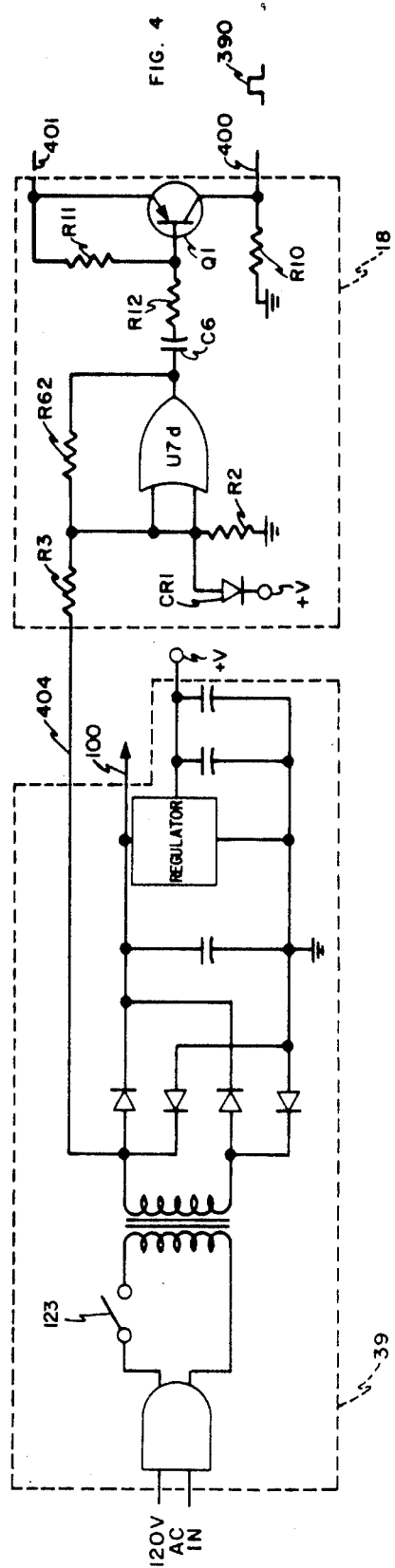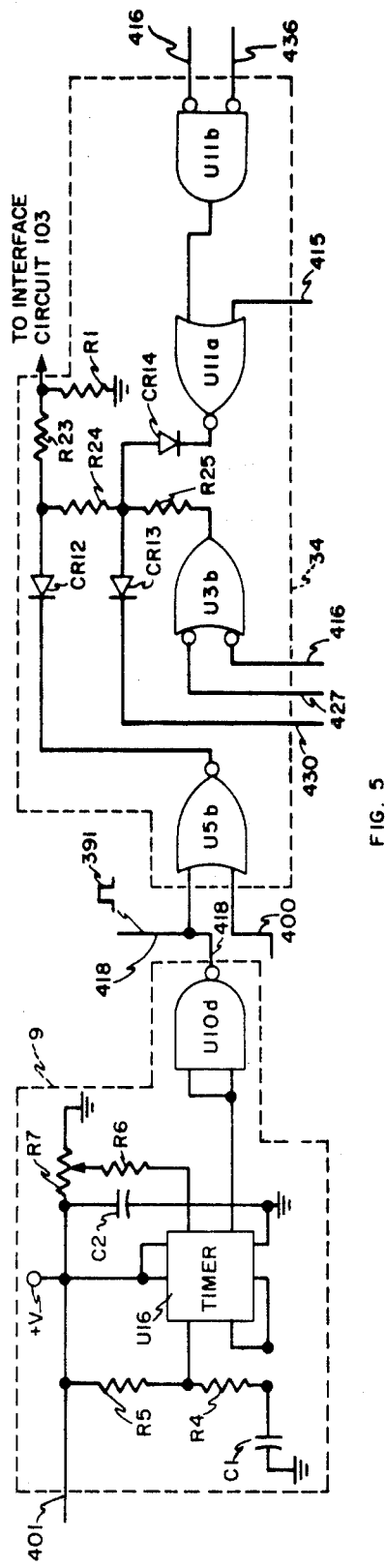

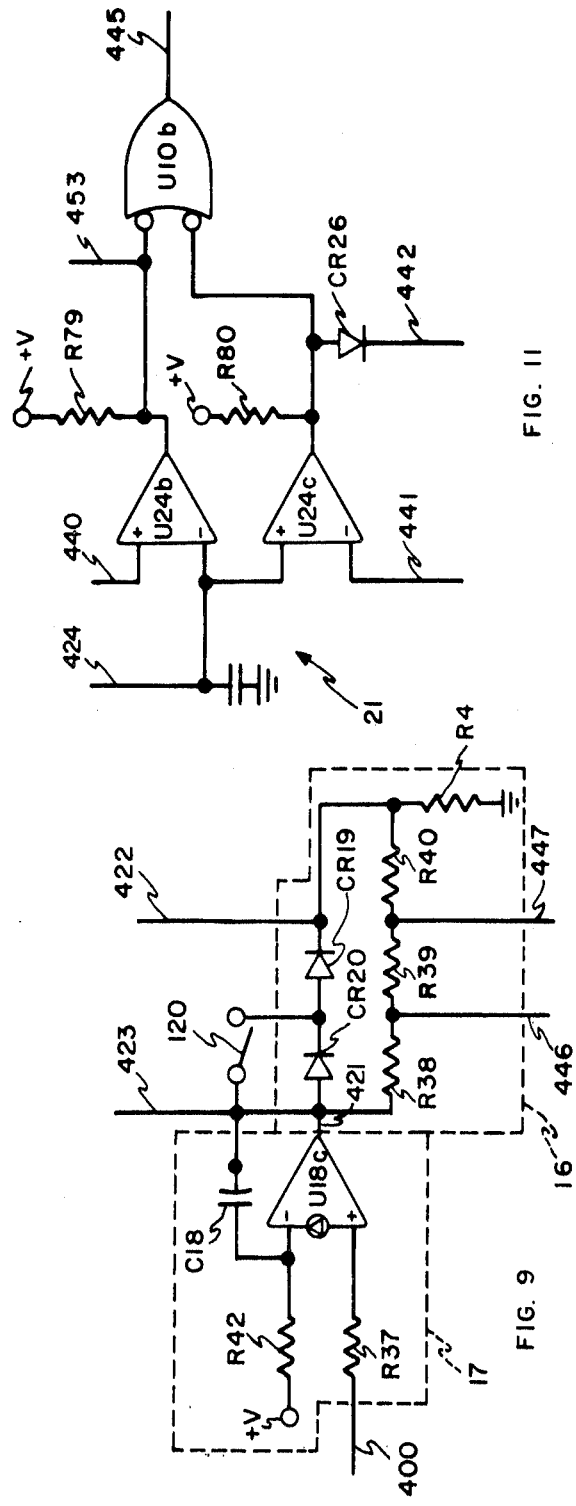
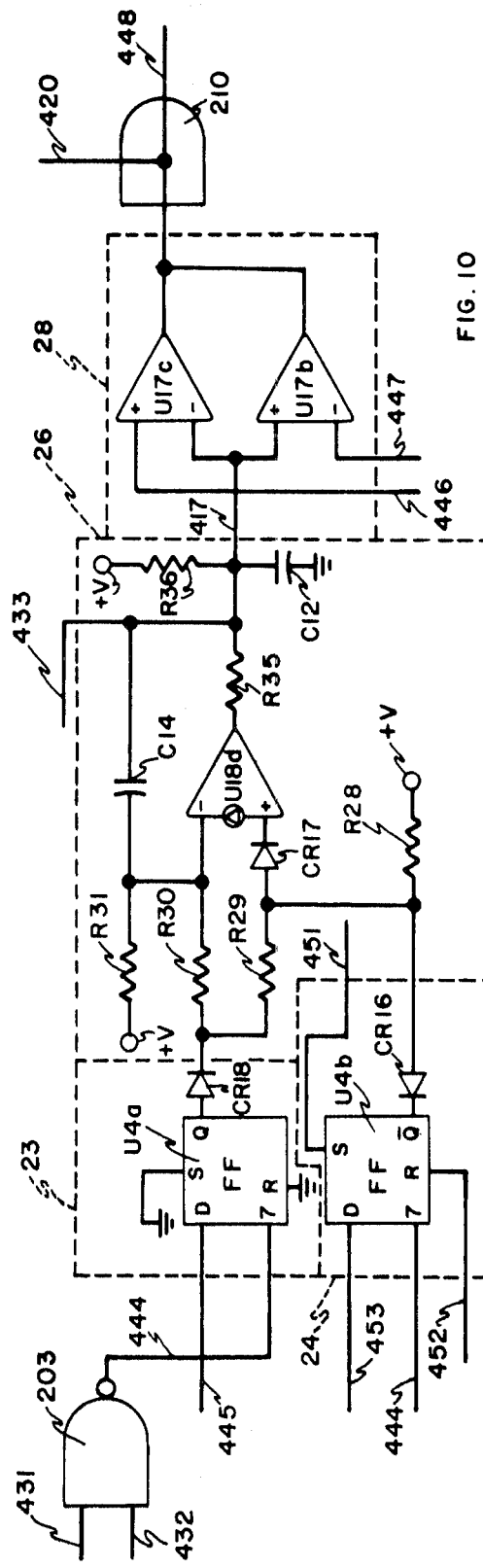

SIMULATED VIDEO GAME

The present invention relates to electronic games wherein events upon the image screen of a television receiver are controlled only in part by human operators.

By way of background and to amplify the specification, attention is called to applications for Letters Patent Ser. No. 640,106, filed Dec. 11, 1975 (Agans), now U.S. Pat. No. 4,009,449; Ser. No. 640,105, filed Dec. 11, 1975 (Dash et al), now U.S. Pat. No. 4,034,983; and Ser. No. 700,647, filed June 28, 1976 (Dash), which applications are hereby incorporated by reference herein.

The Dash et al application is directed mainly to games such as simulated tennis and the like wherein a ball or the like is deflected back and forth across a court or play area by simulated paddles under the control of human operators; movement of the paddles is in the $\pm y$ direction but the ball can move in both the $\pm x$ and $y$ directions. It is an object of the present invention to provide an electronic game of the general type in which the object deflected moves continuously on the screen of a television receiver with two degrees of freedom (i.e., movement is in both $\pm x$ and $\pm y$ direction) but in which the players also can move continously with two degrees of freedom.

While the name applied to the game is not vital for present purposes, the game herein described is called a TV hockey game or a TV soccer game; thus, a further object is to provide a novel TV hockey and/or soccer game.

These and still further objects are addressed hereinafter.

The foregoing objects are achieved in electronic master controller that is operable to produce on the image screen of the television receiver the simulation of a playing area and the simulation of active components. The active components include a simulated object (which is a puck in a TV hockey game or a ball in a TV soccer game or the like) and two simulated players who assume adversary positions as to one another. The controller is adapted to move both the object and the players across the image screen with 2° of freedom, the players being moved under the control of human operators through the electronic master controller. In one case, that of the TV hockey game, the electronic master controller causes the object to adhere to one player or the other until a switch is activated (here closed) to cause the object to be dislodged from the player and to be propelled across the screen, or by some other interaction. In the other case, that of the TV soccer game, the object, when struck by a player, travels along a trajectory whose velocity, i.e., direction and speed, is a function of the velocities of the object and the player at the instant of impact. Movement of the players is only in part under the control of human operators; at least one of the coefficients of velocity and acceleration of all the active components, that is, the players and the object, are controlled by the controller at some position on the screen.

The invention is hereinafter described with reference to the accompanying drawing in which:

FIGS. 4-14 show schematically the elements shown mostly in block diagram form in FIG. 3;

As is noted above, the name applied to the electronic game of the present invention is not important, but to place the game in some common context, the game is called herein a TV hockey/soccer game, it being understood that the particular name is not intended to be limiting. The game described can be made to operate in either the hockey mode or in the soccer mode by appropriate switching. To simplify the discussion that now follows, the hockey mode is taken up first and the soccer mode follows. It will be appreciated that the game herein disclosed is what has come to be called (but is not limited to) "one-on-one".

Figure 1:
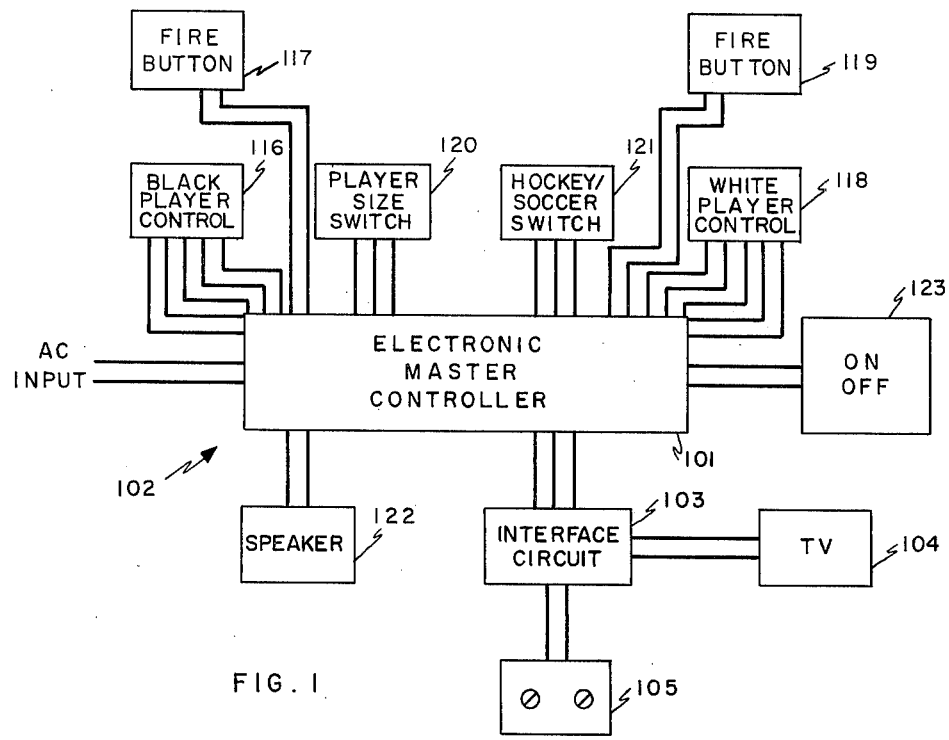
FIG. 1 is a diagrammatic representation of an electronic game that includes a television receiver and an electronic master controller used to present simulated events or components upon the image screen of the television receiver, some of the events, in part, being controllable by human operators through the electronic master controller.

Turning first to FIG. 1, the system 102 is an electronic game that comprises an electronic master controller 101 and a conventional television receiver 104 that operates within a channel allocated for television broadcasting by the Federal Communications Commission, a branch of the United States Government. The controller 101 introduces RF electric signals to the television receiver 104 through an interface circuit or oscillator and anterior switch 103 (see said application Ser. No. 700,647 for details of a useful circuit 103). Broadcast signals to the television receiver 104 are connected into the system 102 through a terminal 105 which is interconnected through the interface circuit 103; a switch in the interface circuit permits local operation and broadcast operation, as desired.

Figure 2:
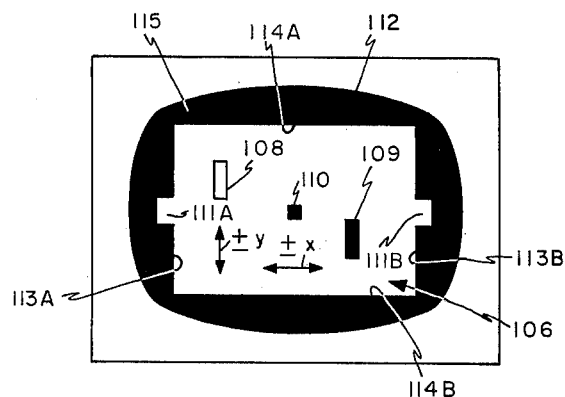
FIG. 2 shows diagrammatically the image screen of the television receiver with simulated components produced thereon.

The master controller 101 produces upon the image screen shown at 112 in FIG. 2 of the television receiver (i.e., on the image screen of the cathode ray tube of the receiver 104) a simulated playing area or playing field 106. The playing field is formed by shading a region on the image screen. The master controller 101 produces also two simulated players 108 and 109, the player on the left being white and the player on the right being black. The white or first player 108 can be moved continuously with two degrees of freedom (that is, in both the $\pm x$ direction and the $\pm y$ direction) within the whole of the area 106 and the black or second player 109 can be moved continuously with two degrees of freedom within the whole of the area 106. The master controller 101 also produces on the image screen an object 110 (here a puck but it can be a ball or the like, depending on the game being simulated) which also moves across the screen continuously with two degrees of freedom and can be intercepted by the players and deflected or held in the manner later discussed. To complete the picture, there are score regions 111A and 111B and a left end or edge 113A and a right end or edge 113B, respectively, of the play area or playing field 106; the top and bottom side lines or borders of the playing area are a marked 114A and 114B. The function of the electronic master controller is to create the various components of the game on the screen 112 and to interface with human operators who act as adversaries in the game, but through the action of the master controller. The playing area 106, as above noted, is a shaded area and is created by a reduced-intensity electron beam; the score regions 111A and 111B are also shaded. The black border labeled 115 is produced by almost cutting off the beam, as are also the black player 109 and the puck 110. The white player 108 is produced by turning the beam to high intensity at the region occupied by the player 108.

The various functioning elements to provide the required acts are described later, but, briefly, the end sought is that of propelling the puck 110 into the area 111A or the area 111B; that is, the player 108 seeks to propel the puck 110 into the area 111B and the player 109 seeks to propel the puck onto the area 111A. And, of course, the adversary player in each instance attempts to block the puck by placing himself between the opposing player and his own score area or region, along the trajectory of the puck. As hereinafter shown, the master controller 101 is at all times aware of the position of the active and the passive components of the game; it notes the coincidence of two such components (e.g., the coincidence of an active component, say the player 109, with a passive component, say the sideline 114A) and takes appropriate and predetermined action upon such occurrence. The terms "active" and "passive" herein denote components that move and do not move, respectively; the play area 106, the sidelines, the ends and the score regions are considered passive in the context just given, but, in a sense, they are active to the same extent that they are in a regular game.

Figure 3:
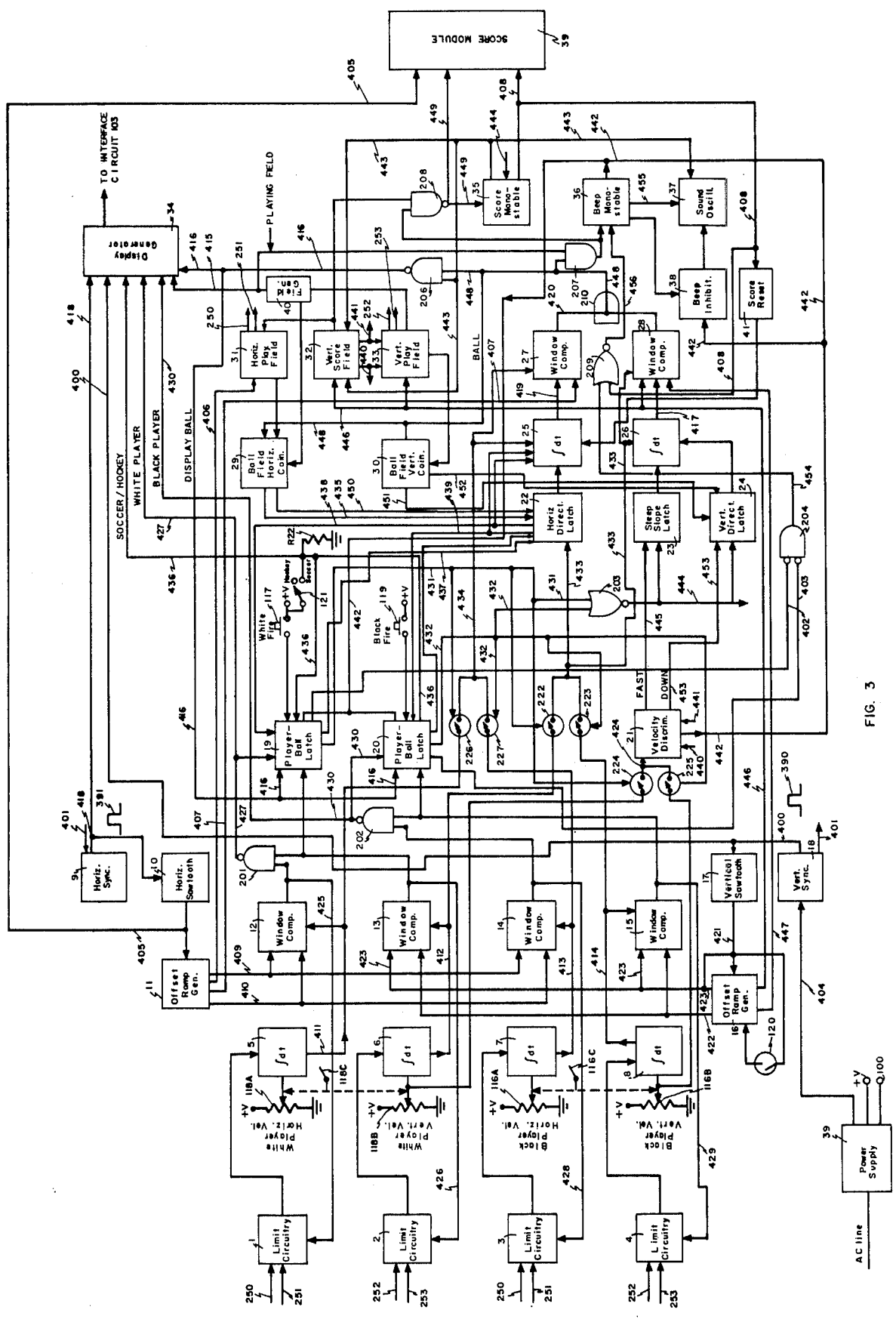
FIG. 3 is a block diagram of the electronic master controller plus some of the other circuit elements of FIG. 1.
Figure 6:
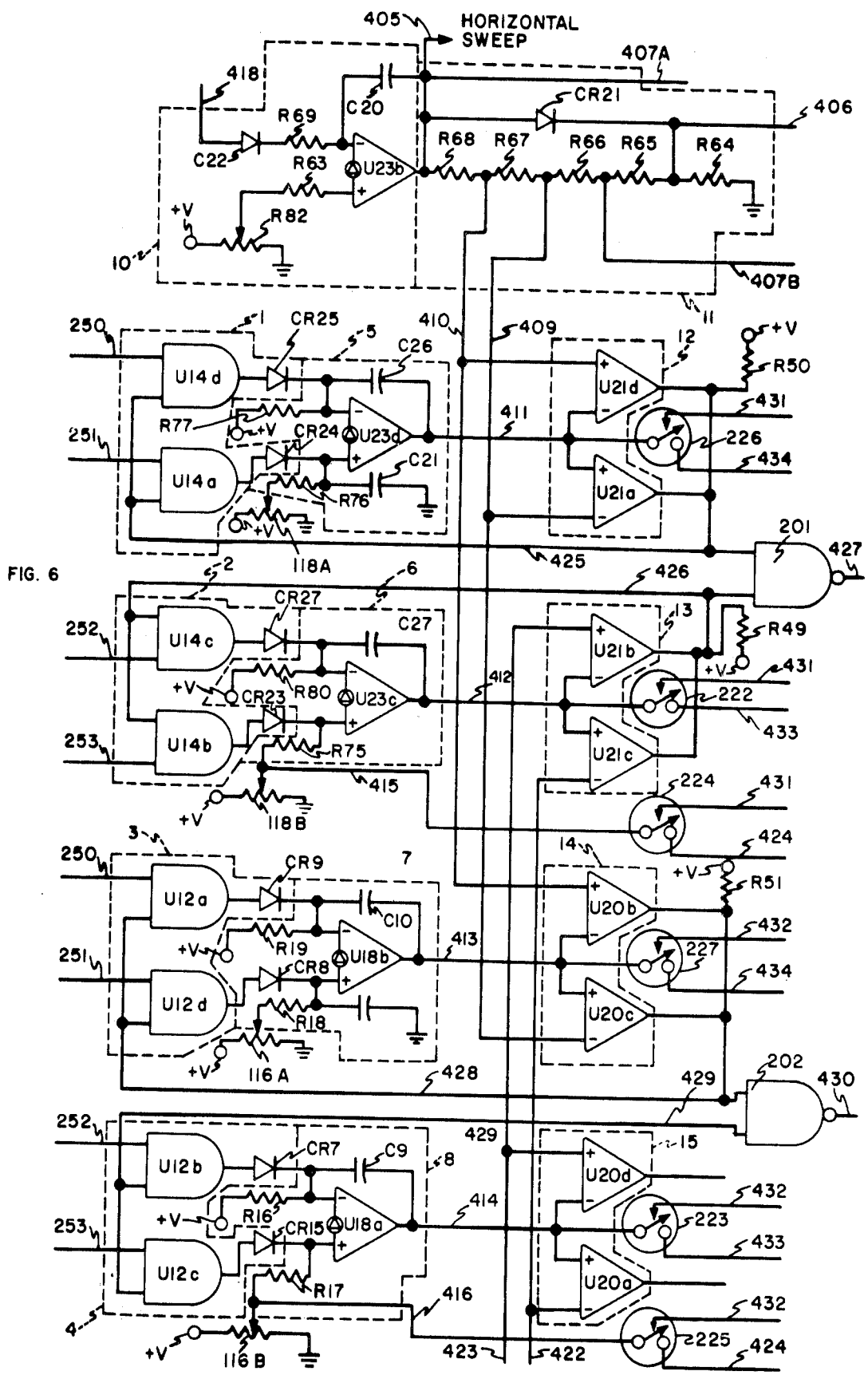

In the explanation that now follows, the diagrammatic representation in FIG. 3 should be used as the primary reference figure since it shows all the elements of the system 102 with the exception of a speaker 122, the interface circuit 103, the conventional television receiver 104 and the terminal 105. The blocks in FIG. 3, as well as the schematic representations therein, are shown in some detail in later FIGS. 4 to 14. In FIG. 3 the lines between blocks represent electrical connections, but a single line can represent more than one connection; for example, a line 407 in FIG. 3 between a horizontal offset ramp generator 11 and a window comparator 27 is, in fact, two conductors 407A and 407B in FIGS. 6 and 8. Not all the conductors or signal connections in FIG. 3 are numbered--only those needed to render cohesiveness to the present explanation. Also, a few minor inconsistencies will show up upon close scrutiny, e.g., the respective leads 411–414 between integrators 5–8 and switches 226,222,227 and 223, respectively, are shown in FIG. 6 passing through window comparators 12–15, respectively, but they are shown connected directly to the switches in FIG. 3 which is the correct representation snce the signal transfer is from the integrator to the switch-- not to the particular window comparator. The conductors or signal channels in FIG. 3 are numbered 100, 250–253 and 400–456; some are discussed further hereinafter but many are not. In the explanation, in general, only those schematics or parts thereof that are deemed to require explanation, are explained; by way of illustration, the power supply shown at 39 in FIGS. 3 and 4 is not discussed since the schematic in FIG. 4 is self-explanatory.

Figure 15:
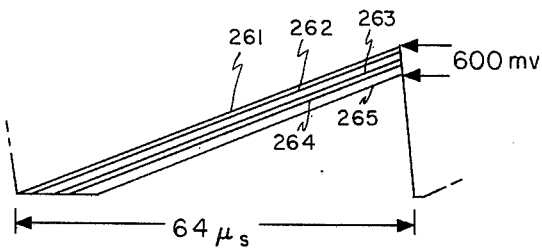
FIG. 15 is a graphic representation showing a plurality of time-voltage horizontal ramps offset from one another on the time scale.
Figures 7, 8:
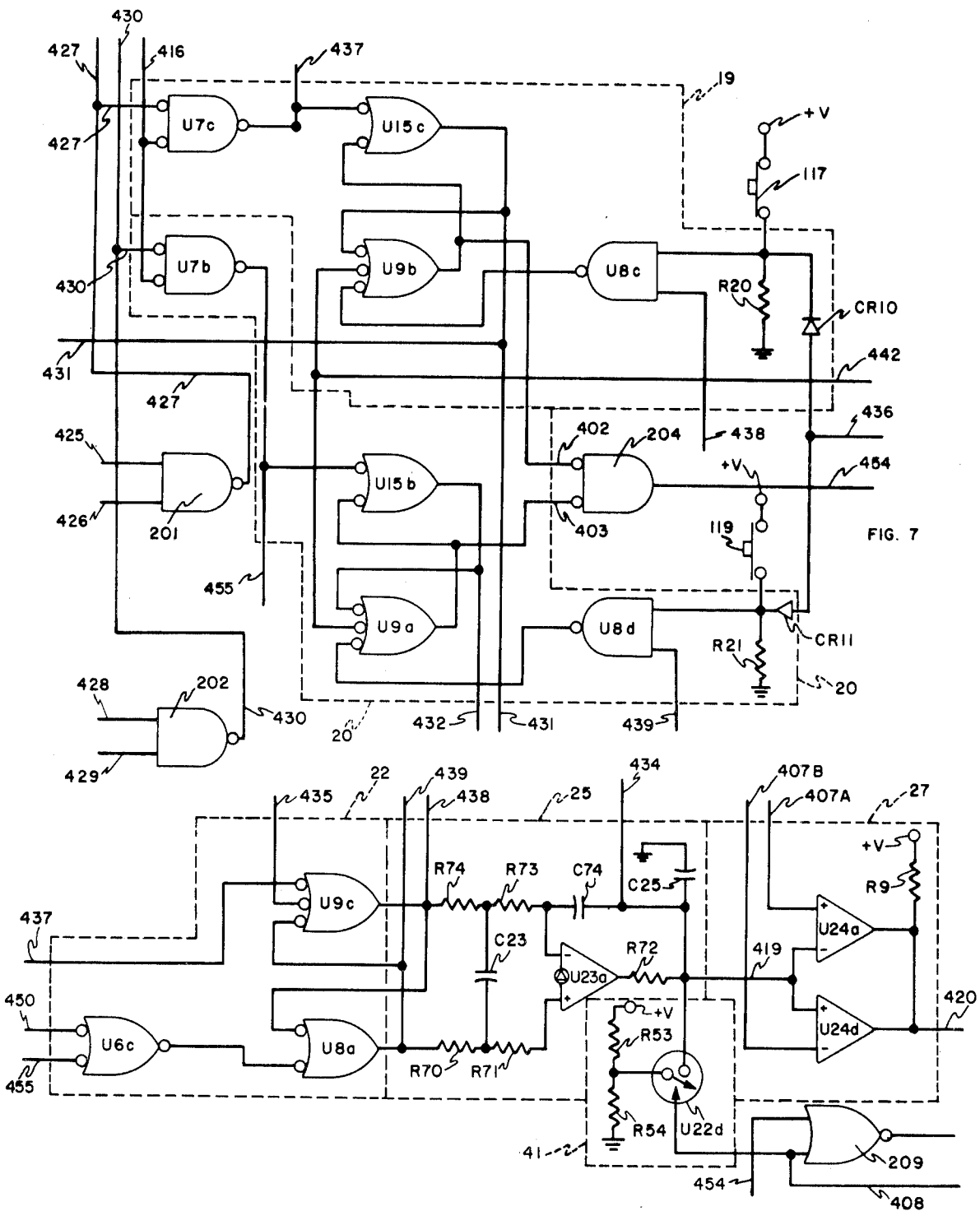

Window comparators of three types (called first, second and third types herein) are used in the system 102 to establish limits of various active and passive components of the game herein disclosed. It may be helpful, therefore, at this juncture to go into some detail on the operation of such window comparators and for that purpose the window comparator 27 (which is of the first type) is used first. The window comparator 27, as shown in FIG. 8, comprises comparators U24a and U24d, the negative (−) input terminal of the comparator U24a being connected to the positive (+) input terminal of the comparator U24d and the output of the two comparators being connected together. The positive (+) input terminal of the comparator U24a is connected to the high end of a resistance network comprising resistors R68-R64 in the offset ramp generator 11 in FIG. 6 and the negative terminal of the comparator U24d is connected to the common connection between resistors R66 and R65 of the network which generates five horizontal voltage ramps 261–265 in FIG. 15, each ramp being slightly offset in time from the others. In the context of the system 102, the voltage across the resistors R68-R64 in FIG. 6 is the voltage drop across a diode CR21 of about 600 millivolts; the ramp spacing is about 150 millivolts and is greatly exaggerated in FIG. 15. The function of the window comparator 27 in FIG. 3 is to establish the $x$ spatial coordinate of the rectangular object or puck 110 in FIG. 2, the $y$ spatial coordinate of the puck 110 being established by a further window comparator 28 in FIG. 3. (The $x$ and $y$ spatial coordinates denote the spatial position of a point as measured on the image screen from the left and top, respectively.)

As above indicated, three types of window comparators are found in the electronic master controller 101. The first type, exemplified by the window comparator 27 in FIG. 8 (and the window comparators 12–15 and 28), as described in the previous paragraph and later, is connected to receive as input two offset voltage ramps and one reference voltage and to provide an output signal when the reference voltage is between the two offset voltage ramps. The second type is found in a horizontal play field generator 31, a vertical play field generator 33, and a vertical score field 32 in FIGS. 3 and 12, as later discussed, and is connected to receive as input two offset reference voltages and a single reference voltage ramp and to provide an output signal when the reference voltage ramp is between the two reference voltages. The third type is found in the velocity discriminator 21 in FIGS. 3 and 11 and receives two reference voltages and one input--not a ramp. It will be observed that the first type comparator is used in the controller 101 to generate active components which move about the image screen, the second type comparator is used to generate passive components and the third type comparator discriminates velocities. The first type window comparator renders it aware of the coefficients of position of the active game components. The second type window comparator merely establishes limiting dimensions for the passive components. The third type receives as input the velocity of a player in contact with the puck 110 and determines the coefficient of velocity of that player.

The manner in which the window comparator 27 functions is now explained in brief detail with reference to FIG. 8. A resistor R9 between a +v voltage (∼12 volts dc in actual apparatus) and a common point 420 allows the common point 420 to be raised to +v whenever neither the comparator U24a nor the comparator U24d is pulling the point down. The comparators U24a and U24d are wire-ANDed together at the common point 420 and hold that point down or low whenever inputs along a lead 419 is not between the actual voltage applied along leads 407A and 407B from the horizontal ramp generator 11. As later explained, similar interaction in the window comparator 28, which receives input from a vertical offset ramp generator 16, occurs and the output of the comparators 27 and 28 are wire-ANDed at 210 in FIG. 3, combined with other signals by a NAND gate 206 and fed as an input to a display generator 34. The simulated players 108 and 109 are generated by window comparators 12 and 13 and 14 and 15, respectively, of the first type, that is, like the window comparator 27.

The window comparators 27 and 28 generate or define the simulated ball 110. To do so, two of the horizontal offset ramps 261-265 in FIG. 15 (which are generated by the horizontal offset ramp generator 11) are combined with two similar ramps (not shown in the drawing) from the offset ramp generator 16 to define the horizontal limits and the vertical limits respectively; a reference voltage to establish the horizontal limits of the ball or puck 110 is provided by the integrator 25 along the lead 419 in FIGS. 3 and 8 and a reference voltage to establish the vertical limits of the ball or puck 110 is provided by the integrator 26 along a lead 417 in FIGS. 3 and 10.

Figures 16, 17:
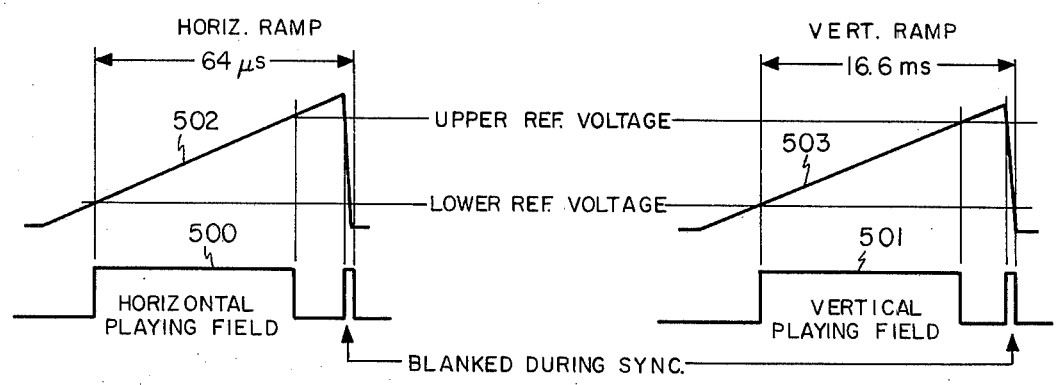
FIG. 16 is a graphic representation showing the time-voltage ramp from which the offset ramps of FIG. 15 are derived, as well as a voltage pulse waveform.
FIG. 17 is a representation similar to FIG. 16 of a vertical time-voltage ramp, as well as a pulse waveform.
Figures 12, 13:
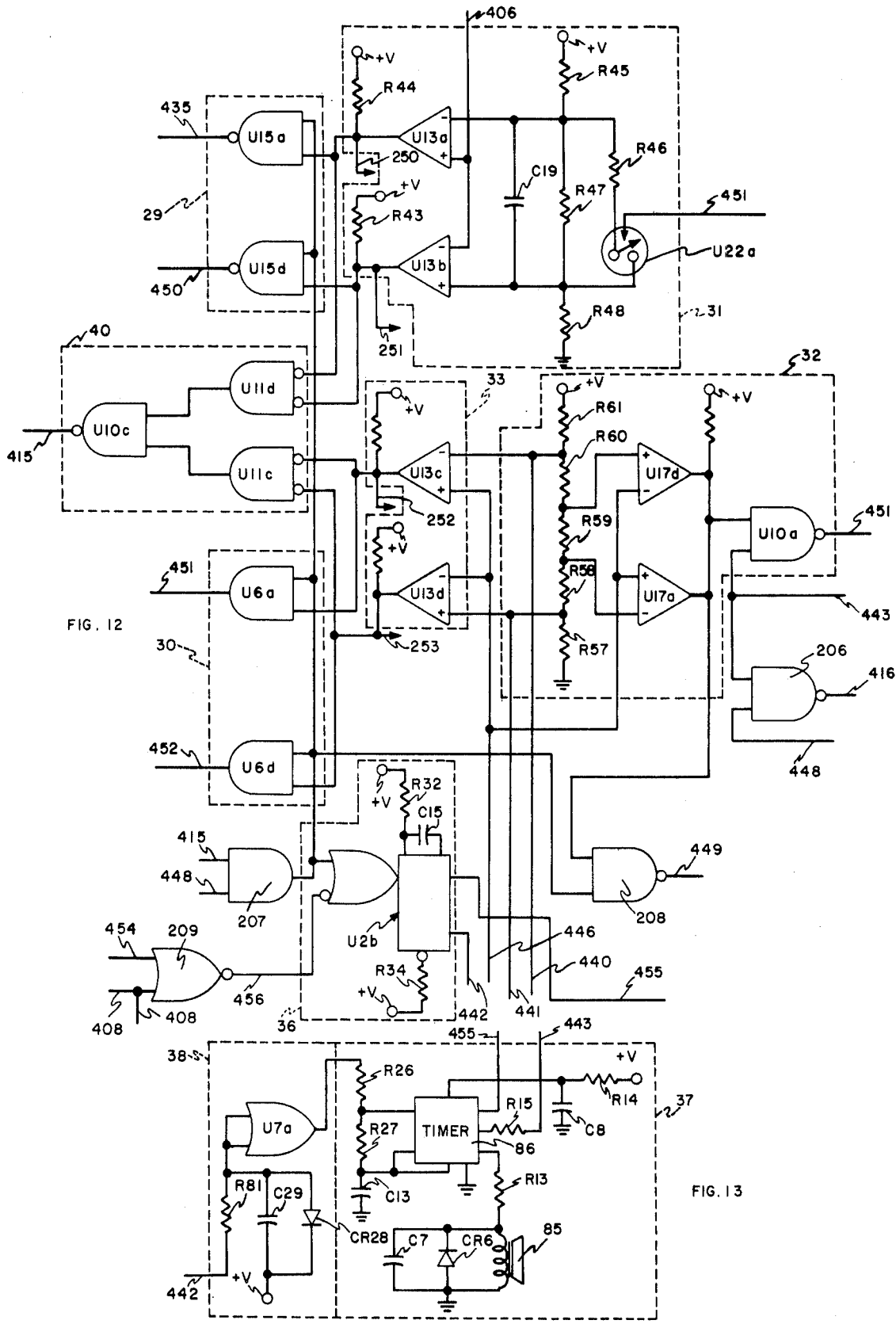

The playing field, as above indicated, is formed by window comparators of the second type, a window comparator comprising comparators U13a and U13b in the horizontal play field generator 31 in FIG. 12 in combination with a window comparator comprising comparators U13c and U13d in the vertical play field generator 33. With reference to FIGS. 16 and 17, horizontal borders or limits or sidelines of the playing area 106 are formed by a pulse 500 at the outputs of the comparators U13a and U13b and the vertical borders or limits of the playing area 106 are formed by a pulse 501 at the outputs of the comparators U13c and U13d.

The pulse 500 is formed between intersecting points of a ramp voltage 502 in FIG. 16 and a lower reference voltage and upper lower reference voltage (also called offset reference voltages herein), respectively, the two offset reference voltages being taken across a resistor R47 in FIG. 12 from the +v dc supply. In this way, the positive input of the comparator U13a is connected to a reference voltage (i.e., the upper reference voltage) and the negative input of the comparator U13b is connected to a reference voltage (i.e., the lower reference voltage), the ramp voltage 502 being taken from the ramp generator 11 along the lead shown at 406 in FIGS. 3, 6 and 12. The pulse 501 is similarly formed between the intersecting points of a ramp 503 in FIG. 17 and a lower reference voltage and upper reference voltage, respectively, the two offset reference voltages being taken across series resistors R58, R59 and R60 in FIG. 12 from the +v dc supply and the ramp voltage input originating in the ramp generator 16 in FIG. 9. Similarly the score areas 111A and 111B are formed by pulses from a window comparator comprising comparators U17d and U17a (FIG. 12) in the vertical score field generator 32. The functioning of the various window comparators and their interaction in the controller 101 are taken up elsewhere at appropriate places in the description.

Events on the TV screen are timed in accordance with horizontal and vertical sync pulses from a horizontal sync generator 9 and a vertical sync generator 18. The vertical sync generator 18, as shown in FIG. 4, forms vertical sync pulses 390 at the lead labeled 400 by using a Schmitt trigger (comprising an OR gate U7d, a diode CR1, resistors R2, R3, R62 and R10-R12, a capacitor C6 and a transistor Q1) to square the 60 Hz ac sine wave on the conductor shown at 404 from the power source 39. The square wave is differentiated by the RC circuit C6-R12 to the base of the transistor Q1; the negative part of the differentiator output drives the transistor Q1 into saturation, producing the positive-going sync pulse 390 which is carried by the conductor 400 to various circuit elements, as shown in the drawing. (In this connection, the label 400 designates a signal point or a common connection point where all circuit points so labeled are at the same potential; thus, in FIG. 5 the number 400 is applied as an input to the display generator 34, but it is applied to other circuit elements as well.)

A vertical sawtooth voltage wave or ramp, such as, for example, the ramp 503 in FIG. 17, is generated by the vertical sawtooth generator 17 in FIG. 9, having an integrator comprising a Norton operational amplifier U18e with negative feedback and a capacitor C18. The voltage output of a Norton operational amplifier responds to the difference between the electric currents of the inverting and noninverting inputs within the amplifier and produces a voltage ramp that is the integral of the electric current to the capacitor C18. The generator 17 further includes resistors R37 and R42. (Due to matching tolerances in devices available within cost constraints, a ten percent error exists in such amplifiers and they can be used only in such parts of the system 102 wherein such error can be tolerated.) The ramp voltage thereby generated is connected as input to the vertical offset ramp generator 16 that, like the ramp generator 11, generates offset ramps, like the ramps 261-265 in FIG. 15, by using diodes CR19 and CR20 and a resistance network made up of resistors R38-R40 and R4. The switch shown at 120 serves to reduce the vertical size of the simulated players 108 and 109 in FIG. 2 by selectively bypassing the diode CR20.

A horizontal sync pulse 391 in FIG. 5 is generated by a horizontal sync pulse generator 9 that includes a 555 precision timer U16 connected as a free-running pulse generator. A potentiometer R7 is used to vary the control voltage to the timer to allow tuning of the sync pulses 391 to a nominal period, here 64μs. The timer output is inverted by a CMOS NAND gate U10d to distribute positive-going horizontal sync pulses 391 to other circuit elements in the system 102. The generator 9 further includes resistors R4, R5 and R6 and capacitors C1 and C2.

The horizontal sawtooth generator 10 in FIG. 6 generates a positive going ramp which is fed as input to the offset ramp generator 11 and appears, as well, at the lead marked 405. The positive-going horizontal ramp, like the vertical ramp, is generated by a Norton operational amplifier U23b and capacitor C20. Because the Norton operational amplifier used in the game 102 has a limited slew rate in the positive direction, a fast negative slew rate is needed. Therefore, due to the previously mentioned errors in integrators of the type used, a potentiometer R82 is employed to adjust the important positive slope of the horizontal sawtooth or ramp voltage. A diode C22 and resistors R63 and R69 complete the horizontal sawtooth generator 10.

With the foregoing serving as a foundation, the operation of the game 102 as a TV hockey game is now gone into in some detail. Operation in the hockey mode is accomplished by closing the electric switch shown at 121 in FIG. 3 upon the upper (i.e., hockey) contact thereof, which renders active a white player ball (i.e., puck) latch 19 and a black player ball (i.e., puck) latch 20. The hockey-game operation is briefly summarized in the next paragraph and the interacting circuit elements to effect operation are then described.

The puck 110 moves about the playing field 106 along trajectories established by the controller 101; if it strikes the borders 114A and 114B or the ends 113A and 113B, it caroms back into the playing field, but it passes into the score zones 111A and 111B without reflection. Also, the puck 110 will adhere to either the white player 108 or the black player 109 in the field 106 due to action of the latching circuits 19 and 20, respectively, and will be repelled from such adherence by closing a normally open white fire switch 117 or a black fire switch 119, respectively, in FIG. 3. The velocity vector of the puck 110, when the particular latch is rendered inactive or disabled, depends on conditions just prior to closing the switch--but more about that later. Movement of the players 108 and 109 is accomplished respectively by movement of a joy stick 118C (which simultaneously moves the wiper arms of the potentiometers 118A and 118B, i.e., the joy stick 118C and the two potentiometers 118A and 118B act as a first joy stick and potentiometer combination that constitutes a black player control 118 in FIG. 1) and a joy stick 116C (which simultaneously moves the wiper arms of potentiometers 116A and 116B, i.e., the joy stick 116C and the potentiometers 116A and 1166B act as a second joy stick and potentiometer combination) to change the outputs of integrators 5 and 6 (also called first integrator means, herein) and 7 and 8 (also called second means of integrators, herein), respectively. (Said another way, in terms of this specification, manual movement of the joy stick serves to change the coefficients of acceleration and the velocity hereinafter discussed.) The integrators are biased so that a centered potentiometer produces approximately zero velocity, and movement of the players about the playing field with two degrees of freedom is effected by moving the joy stick from the zero position. The direction of movement of a player (i.e., $\pm x$ and $\pm y$) in FIG. 2 is determined by the direction of pivot of the handle of the associated joy stick in FIG. 3. By way of illustration, with the joy stick 118C in the position shown, movement of the white player 108 will be toward the right; pushing the joy stick up will cause the white player to move up or in the $+y$ direction; pushing the joy stick 118C down will cause the white player to move in the $-y$ direction, and so forth. Also the speed of the particular player depends on the amount of pivot of the joy stick from the zero position. Hence, the joy stick position determines velocity and a change in position effects acceleration. The generation of and the movement of the white player 108 upon the image screen is now explained further.

The white player velocity voltages from the potentiometers 118A and 118B are integrated by the integrators 5 and 6, respectively, to provide voltages along leads 411 and 412, respectively, as one input to the window comparators 12 and 13, as shown in FIG. 6.

(The voltages at the outputs of the integrators 5 and 6 represent the horizontal and vertical positions, respectively, of the white player and changes in the voltages represent changes in position, i.e., $dx/dt$.) The window comparator 12 receives a horizontal ramp voltage (i.e., the voltage ramp generated across the resistor R67 in the ramp generator 11) and the window comparator 13 receives a vertical ramp voltage (i.e., the voltage ramp generated across the diodes CR19 CR20 or just CR20 of and the vertical ramp generator 16 in FIG. 9). The offset of the voltage ramp from the horizontal ramp generator 11 determines the x-dimension of the white player 108 and the offset of the voltage ramp from the vertical ramp generator 16 determine the y-dimension (i.e., height) of the player 108. The switch 120 can bypass the diode CR-20 in FIG. 9 and thereby reduce the height of the player 108, as previously mentioned. Signals from the window comparators 12 and 13 are connected through a NAND gate 201 to the display generator 34 where they are combined with other signals to provide a composite signal that controls the electron beam of the CRT of the television receiver 104 in FIG. 1. The same signals are connected as one input to the white player ball latch 19 that receives another input that originates as output from the window comparators 27 and 28 that generate the puck 110. When the signals from the comparators 12 and 13 are the logical equal of the wire-ANDed signals from the comparators 27 and 28, that is, the signals coincide in time indicating that the white player 108 and the puck 110 are at the same x-y spatial coordinates on the TV image screen, the latch 19 locks the player 108 and the puck 110 together; thereafter the two move together until: (1) the black player 109 is moved over to effect contact with the white player 108; (2) the white player collides with a boundary (i.e., a sideline 114A or 114B or an end 113A or 113B) of the field 106; or the switch 117 in FIG. 4 is closed, thereby disabling the latch 19. The velocity of the puck immediately following release from the player is determined by the controller 101 on the basis of the situation that existed at the time of release, as later explained.

The black player 109 is generated in the same manner as the white player by the elements associated with the window comparators 14 and 15 whose combined outputs are connected in the manner shown in FIG. 3 through a NAND gate 202 to the display generator 34 wherein they are combined with other inputs to form a composite output pulse that is connected to the TV receiver, and the combined outputs are connected as inputs to the black player ball latch 20 that receives a further input from the window comparators 27 and 28 and, like the latch 19, serves to secure the puck 110 and the player 109 together in the circumstances discussed in the previous paragraph. Closing the black fire switch 119, as before, deactivates the latch 20.

Players are kept within the play field 106 by limit circuity 1, 2, 3 and 4 in FIG. 3, which detect the coincidence of a player with an edge or boundary of the field, as now explained. The inputs to the limit circuitry come from the horizontal play field generator 31 and the vertical play field generator 33 along leads 250-253, as shown. Referring now to the limit circuitry 1 in FIG. 6, the input 250 is connected to an AND gate U14d whose output is connected through a diode CR25 to the integrator 5; the input 251 is connected to an AND gate U14a whose output is connected through a diode CR24 to the integrator 5. A further input along the conductor 425 is received from the window comparator 12 which serves, together with the comparator 13, to generate the white player. The AND gates U14d and U14a, along with AND gates U14c and U14b in the limit circuitry 2, combine the three inputs to give a combined output indicating coincidence of the white player with either of the boundaries 114A and 114B or the edges 113A and 113B of the field 106. In such circumstances, a large electric current is introduced through the diodes CR25 and CR24 to the integrator 5 (or through corresponding diodes CR27 and CR23 in the circuit 2 of the integrator 6) to move the player away from the particular edge or boundary. That heavy current is limited only by the drain-source resistance of the pull-up FET in the CMOS AND gates U14d and U14a (and the AND gates U14c AND U14b); hence the player 108 moves away from the boundary or edge very rapidly and returns toward the boundary or edge again at a much slower rate, so long as the joy stick position tends to keep him there. Consequently, the duty cycle of the high circuit pulse is small, keeping the average power dissipation at a safe value. Appropriate action to move the white player, of course, is effected by the window comparators 12 and 13 by messages along the conductors 411 and 412, respectively. AND gates U12a and U12d and diodes CR9 and CR8 form the circuitry 3 and AND gates U12b and U12c and diodes CR7 and CR15 form the circuitry 4; and, in each instance, performance is the same as the circuitry 1 and 2 discussed above.

The switches numbered 222-227 in FIG. 3 and elsewhere and now discussed are analog switches. It should be noted that signals along a lead 431 from the latch 19 control and conductive state of the analog switches 226, 222, and 224 and signals along a lead 432 from the latch 20 controls the conductive state of the analog switches 227, 223 and 225.

The switch 224 connects from the white player vertical velocity potentiometer 118B to a window comparator comprising comparators U24b and U24c in the velocity discriminator circuit shown at 21 in FIG. 11. The velocity discriminator 21 indicates whether the white player is moving up or down and the speed thereof, that is, the discriminator 21 notes the velocity of the white player 108; and, similarly, it notes the velocity of the black player 109.

The analog switch 222 connects the white player vertical position as indicated by the output of the Norton operational amplifier U23c directly to the vertical ball position input of the window comparator 28 (see the bypass lead labeled 433 in FIGS. 3 and 10), bypassing the vertical ball position integrator labeled 26. The switch 223 performs the same function with respect to the black player.

The analog switch 226 connects the white player horizontal position directly to the horizontal ball position input of the window comparator 27 (see the bypass lead labeled 434 in FIG. 3 and FIG. 8), bypassing the horizontal ball position integrator labeled 25. The switch 227 performs the same function with respect to the black player.

On the basis of the explanation just made, it should now be apparent that the switches 226, 222 and 224 are rendered conductive by the latch 19, when the position of the puck 110 and the white player 108 coincide, that is, the puck is captured by the player and moves about the play field 106 with the player whenever the joy stick 118C is moved. In actual apparatus, the puck 110 is wider (i.e., has a larger x-dimension) than the player so that during the period of capture it is apparent which player has control of the puck.

When the white player 108 captured the puck, a horizontal direction latch 22 in FIG. 8 was set so that, if the puck was not under the direct control of the white player, it would travel horizontally toward the right goal 111B in FIG. 2 the white player's objective. The output of the horizontal ball position indicator marked 25 in FIG. 8 goes to ground and stays there while the while the white player has control of the puck. A resistor R72 at the output draws current through the analog switch (i.e., the analog switch shown at U22d) holding the puck horizontal position to that of the white player. This current develops a slight voltage across the approximately 80Ω resistance of the analog switch, causing the puck to be slightly offset toward the left goal.

As above noted, there are three cases in which the white player may now be relieved of the puck. In the first case, he may shoot the puck using the fire button 117; there is gating in the latch 19 to assure that only the white player may fire the puck when he controls it. At the instant of firing, the outputs of the velocity discriminator 21 are transferred to a steep slope latch 23 and to a vertical direction latch 24. From this the controller 101 knows the direction the player was traveling at the moment of release, and the steepness of his movement. From this information, four ball movement angles in the ± y direction can be discerned, steep up, level (i.e., not steep) up, level down, and steep down. The "steep or level" bit is loaded into D Flip-Flop U4a in FIG. 10 and the direction bit into a D Flip Flop U4b. The white player ball latch is cleared, releasing control of the puck.

In the second case, when both players attempt simaltaneous control of the puck (i.e., checking), both the white player ball latch 19 and the black player ball latch 20 will go momentarily high triggering a beep monostable 36 (FIG. 12) which holds both ball latches reset for the duration, allowing the puck to go free. The beep monostable 36 also gate a sound oscillator 37 in FIG. 13 ON to create a short, low-pitched beep.

The third case occurs if the player in control of the puck, here the white player, collides with a side wall, the puck 110 will, in this instance, rebound from the wall free of the player.

Control of the puck by the black player is similar to that described above with respect to the white player.

A free moving puck is kept within the play area 106 by a ball field horizontal coincidence circuit 29 in FIG. 12 which sets or resets the horizontal direction latch 22 (FIG. 8) and a ball field vertical coincidence circuit 30 (FIG. 12) which sets or resets the vertical direction latch 24 (FIG. 10), thereby keeping the puck within the play area. Also, a signal from the ball coincidence circuit triggers the beep monostable 36 (FIG. 12) which energizes the sound oscillator 37 (FIG. 13) to provide a low-pitched beep.

Figure 14:
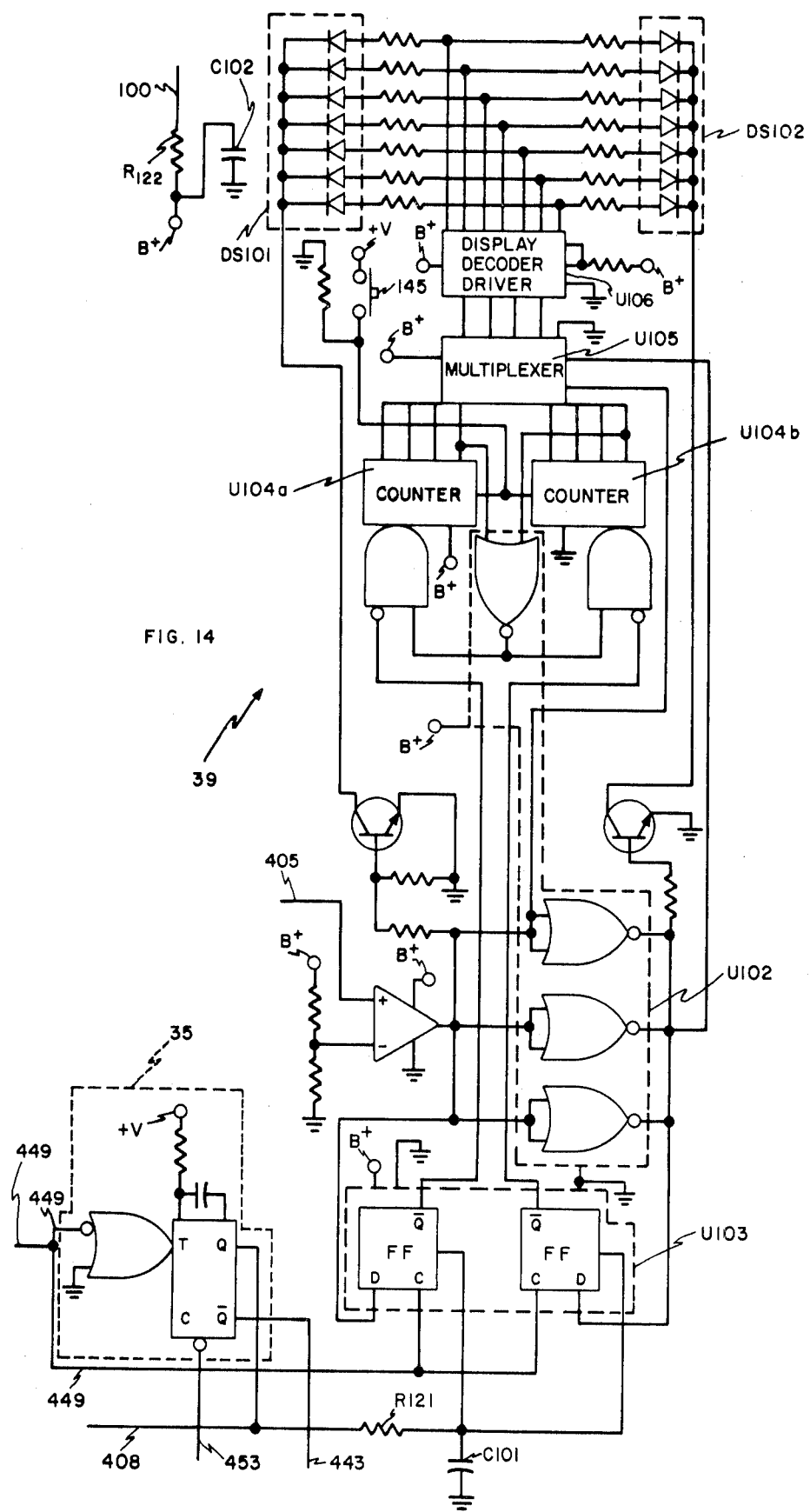

Whenever the puck 110 moves into the goal 111A or the goal 111B, the coincidence triggers a score monostable 35 in FIG. 14 which triggers a short, high-pitched beep and which, further, blanks the goal areas and the puck for about 3 seconds. While thus blanked, the puck is held in the horizontal center of the field by an analog switch U22d in FIG. 8 from a low impedance resistive devider consisting of resistances R53 and R54 in FIG. 8 to the horizontal ball position integrator 25. The puck is free to move vertically and does so under control of the vertical ball field coincidence circuit. At the end of the score interval, the puck appears on the playing field at a random vertical location, usually moving away from the side scored upon.

The display generator 34 combines signals to generate the simulated puck 110, the field 106, the players 108 and 109, and so forth, to produce a composite video signal that goes to the television receiver. That signal produces the black border 115 by, in effect, darkening the area 115, that is, there is a low intensity signal during the time the raster scan beam traverses the area border 115; the black player 109 is similarly formed. The field 106 and the goal or score areas 111A and 111B are formed by a moderate intensity beam that provides a grey area. The white player 108 is formed by a high intensity electron beam. In what now follows, the circuit elements, not discussed in detail before, are taken up.

The display generator 34 in FIG. 5 comprises in FIG. 5 an OR gate U5b, a gate U11b, resistors R1 and R23-R25, and diodes CR12 and CR13.

The latches 19 and 20 of FIG. 7 consist respectively of OR gates U7c and U7b, NAND gates U15c and U15b, NAND gates U9b and U9a, NAND gates U8c and U8d, resistors R20 and R21 and diodes CR10 and CR11.

The horizontal direction latch circuit 22 comprises an AND gate U6c in FIG. 8, a NAND gate U9c and a NAND gate U8a; it serves to determine x direction of ball movement at all times.

The integrator 25 of FIG. 8 includes a Norton operational amplifier U23a and capacitor C74 that function in the same manner as the corresponding element U23d and C26 in the integrator 5; it further includes resistors R70-R74 and a capacitor C25.

The score reset circuit 41, as shown in FIG. 8, consists of the analog switch U22d and the resistors R53 and R54. Following coincidence of the ball 110 and a score area (i.e., 111A or 111B) the ball 110 disappear by action of the score monostable 35 (FIG. 14) and NOR gate U11b in the display generator 34 and re-appear by action of the score monostable 35. The function of the score reset circuit 41 (FIG. 8) is to reset the horizontal position of the ball 110 to the center of the screen during the score interval.

Referring now to FIG. 10, the vertical direction latch circuit 24 is shown consisting of a flip-flop U4b and a diode CR16. The steep slope latch 23 includes a flip-flop U4a and a diode CR18. The integrator 26, like the integrator 25, comprises a Norton operational amplifier U18d and capacitor C14, in combination, plus resistors R29-R31, R28, R35 and R36, and a capacitor C12. The window comparator 28 comprises comparators U17c and U17b; the resistor R9 in the window comparator 27 of FIG. 8 serves to present a high output from either comparator 27 or 28 when the particular output is not being held down in the manner mentioned previously herein.

Turning now to FIG. 12, the field generator shown at 40 comprises a NAND gate U10c and NOR gates U11d and U11c. The ball field horizontal coincidence circuit 29 consists of NAND gates U15a and U15d and the ball field vertical coincidence circuit 30 consists of AND gates U6a and U6d. The beep monostable 36 includes a monostable U2b, resistors R32 and R34 and a capacitor C15. The horizontal play field 31 and the vertical play field 33 respectively include window comparators comprising comparators U13a and U13b and U13c and U13d, as shown in FIG. 12, and the block 31 is shown including resistors R43-R48, a capacitor C19 and an analog switch U22a. The vertical score field 32 also includes a window comparator, consisting of comparators U17d and U17a, and it includes a NAND gate U10a.

The beep inhibitor 38 of FIG. 13 consists of an OR gate U7a, resistor R81, a capacitor C29 and a diode CR28 and serves to inhibit tones from a speaker 85 in the sound oscillator shown at 37. The sound oscillator 37 further includes a timer 86 capacitors C13 and C7-C8, resistors R26-R27 and R13-R15.

The score module 39, as shown in FIG. 14, uses a comparator to determine whether the horizontal sweep of the raster scan beam is on the left or right half of the screen 112 in FIG. 2. This signal is used to multiplex the input conditioning circuitry U103 (comprising two D-flip-flops in a broken-line box representing a chip) in determining which side has scored, as well as multiplexing the outputs of score counter U104a and U104b to the LED readouts DS101 and DS102 through multiplexer U105 and decoder/driver U106. A NOR gate to the MSB output of each counter disables the inputs of both counters U104a and U104b when either player reaches a score of eight. A push button 145 is provided for manual reset of the score module to reset both counters to zero. Ball Score is a negative-going pulse taken at the input to the score monostable 35. The rising edge of this pulse sets one D flip-flop in the circuitry U103 and clears the other, according to the side scored on. The high-going output of the score monostable 35 is applied through an RC delay (i.e., a resistor 121 and capacitor C101) to reset both flip-flops in the circuitry U103 a short time later. The negative-going transition of the flip-flop output for the side having scored clocks the corresponding counter, i.e., the counter U104a or the counter U104b. The gates in the broken line marked U102 are NOR-INVERTER gates in chip form. The B+ voltage shown applied various places in FIG. 14 is derived from a voltage on the conductor 100 from the power supply 39 and is modified by a resistor R122 and capacitor C102.

The hockey game is converted to a soccer game by moving the switch 121 in FIG. 3 to the bottom contact thereby disabling the latch circuits 19 and 20. The switch 121 is connected between +v and a resistor R22 to ground. The difference between the hockey game and the soccer game is that in the latter the ball 110 bounces off the forward surface of the simulated players 108 and 109 rather than being captured by one or the other.

The system 102 discussed above is a somewhat specific embodiment of a game which can be more generally described as a system or game wherein there is external or manual control (e.g., by the controls 116 and 118) over at least some of the active components (e.g., the players 108 and 109) of the game and wherein there is, in addition, automatic control over these same active components. The generalized concept is discussed below with reference to FIG. 18, but first there is given an explanation of the mathematics of the generalized system.

It is the intention of the present invention to show how a more realistic electronic game can be made, one in which the master electronic controller and the external control means both serve to modify the coefficients of the equation of motion of the active objects on the screen. The motion of an object in one dimension (e.g., the x direction) can be mathematically described by the expression:

$$A(d^2x(t)/dt^2) + B(dx(t)/dt) + Cx(t) = D,$$

wherein A represents the coefficient of acceleration, B the coefficient of velocity, C the coefficient position and D the coefficient of spatial coordinate offset of the object. The resultant equation is called the parametric equation of motion and describes the movement of an object at all times. Changing any of the parametric coefficients will change this motion. For example, a fixed object would have A=0, B=0, and the value of D/C would represent the object's x position. An object moving at constant velocity would have A=0 and C=0. Higher order coefficients can be added; however, such motion is rarely found in nature.

An electronic game, therefore, can be made by taking the coefficient of the parametric equation of motion of an object on the screen and modifying its parametric coefficients as a function of time either by external control means or by an internal master electronic controller or both. In the system 102 in FIG. 1, the external control means consists of the black player control 116 and the white player control 118 and the internal control means consists of the various logic and other elements within the master controller 101.

Figure 18:
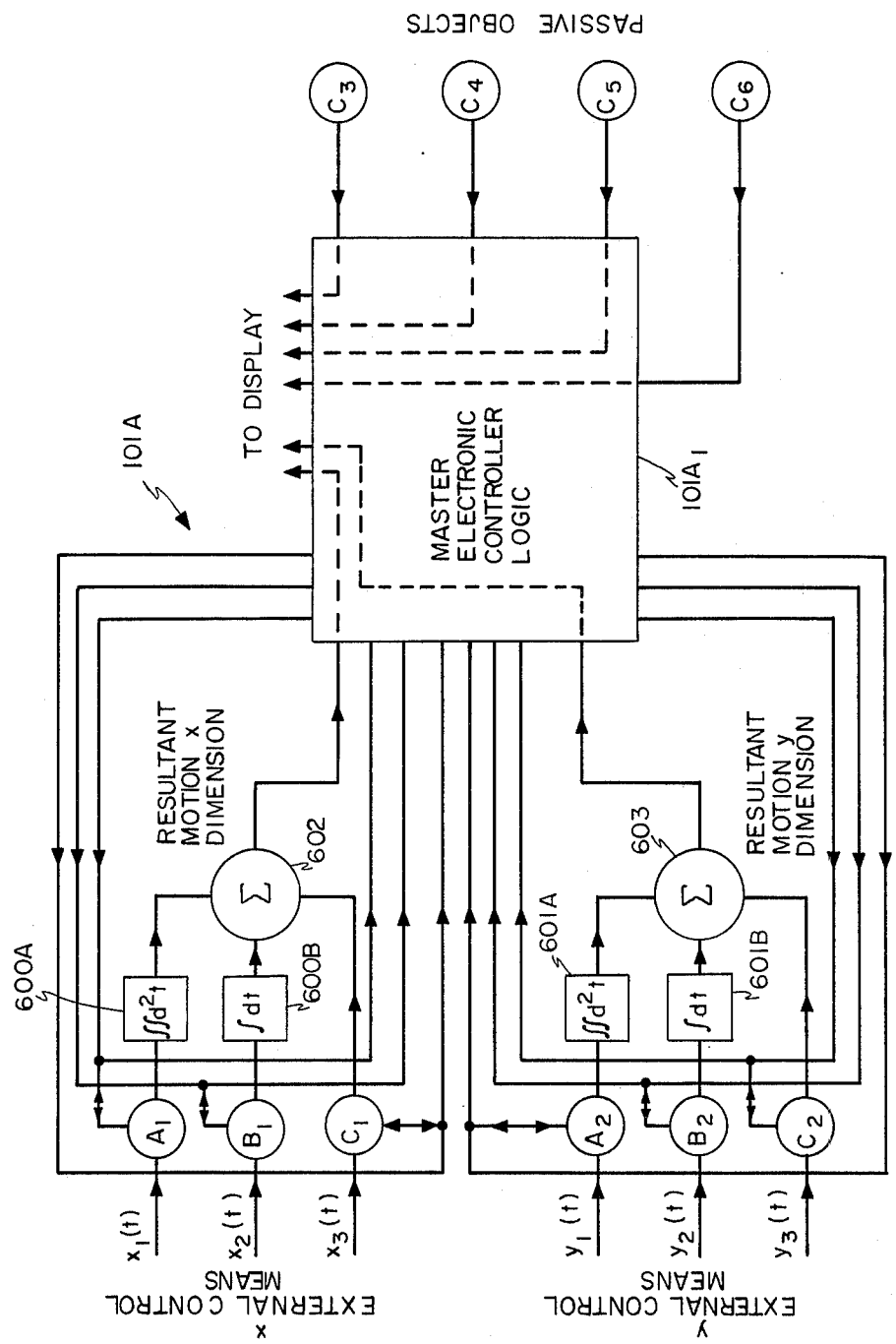
FIG. 18 is a functional block diagram representation of a generalized concept of the logic an electronic game of which the game shown in FIG. 1 is one embodiment.

Since the coefficients are controllable both externally or manually and internally or automatically, the latter being effected in accordance with the algorithm of the circuit logic in the controller, each can be considered to have two factors, an externally controllable factor and an internally controllable factor. In FIG. 18, by way of illustration, the externally controllable factor of the coefficient A (as it relates to the motion in the x direction) later noted, is $A_1$ but the final effect of the coefficient $A_1$ on the motion of the electron beam is modified by the master controller in a fashion determined by the programmed algorithm of the controller.

Turning now to FIG. 18, there is shown one possible arrangement or example of the generalized concept just discussed. In the example shown in FIG. 18, one object, controllable in the x and y directions, is considered, and the coefficient D equals 0. The coefficients $A_1$ and $A_2$, $B_1$ and $B_2$ and $C_1$ and $C_2$ correspond respectively to externally controllable factors of the coefficients A, B and C in the above expression and relate to motion in the x direction and y direction, respectively. The coefficients $C_1$ and $C_2$ and the coefficients marked $C_3$, $C_4$, $C_5$ and $C_6$ relate to positional or stationary components; the components $C_3$, $C_4$, $C_5$ and $C_6$ relate to passive components or spatial positions or coordinates in the image screen; the coefficients $C_3 - C_6$ are usually fixed logic parameters in the master electronic controller logic marked 101A (which may differ from the controller 101) in FIG. 18. The coefficients $C_1$ and $C_2$ may, but need not, be so fixed. The factors $A_1$ and $A_2$ and $B_1$ and $B_2$ are changeable by, for example, controls, like the controls 116 and 118, and, as thusly modified, are processed by an electronic master controller 101A that comprises integrators 600A, 600B, 601A and 601B whose outputs are summed by summers 602 and 603, as shown. Combined signals representative of the combined factors $A_1$, $B_1$ and $C_1$ (and $A_2$, $B_2$ and $C_2$) are fed as input to electronic master controller logic 101A$_1$ and there acted upon to provide the coefficients A, B and C that, in fact, control movement of the electron beam.

In the example of FIG. 18 and with reference to movement of the single objects in the x direction only, the total x movement can be described as $$A_1 \int \int x_1(t) dt^2 + B_1 \int x_2(t) dt + C_1 x_3(t) = x(t).$$

The electronic master controller logic 101A$_1$ in FIG. 18 is aware of both the resultant motion and the coefficients of the parametric equation. The electronic master controller logic 101A$_1$ evaluates these coefficients and this motion, and, on the basis of this information and its programmed algorithm, modifies the external coefficient factors $A_1$, $B_1$ and $C_1$, to provide an output signal that is a composite signal formed by the logic 101A$_1$ from the input signals representing $A_1$, $B_1$ and $C_1$, thereby changing the motion of the object. Stationary objects (passive objects) have A and B coefficients that equal zero. In this way, any number of objects can be modeled and displayed, the result being a truly accurate representation of a game.

Further modifications of the invention herein disclosed will occur to persons skilled in the art and all such modifications are deemed to be within the spirit and scope of the invention as defined by the appended claims.

What is claimed is:

1. For use in an electronic game wherein simulated images are produced on the image screen of a television receiver, electronic controller means operable to produce on said image screen the simulation of a playing area or region and other passive components of the game and the simulation of a plurality of active components, said active components comprising two simulated players that assume adversary positions relative to one another and an object that moves about the playing area or region, said electronic controller means including, in combination, first player signal generating means to provide a first player signal that serves to generate on the image screen one of the two simulated players, second player signal generating means to generate a second player signal that serves to generate on the image screen the second of the two simulated players, object generating means that serves to generate said object on the image screen, latch means connected to receive the first player signal, the second player signal and the object signal and adapted to note the coincidence of a player signal and the object signal and to lock the particular simulated player and simuobject together on the image screen, and means to disable said latch means.

2. Playing apparatus as claimed in claim 1 in which the electronic controller means includes window comparator means which establishes boundaries of said playing area or other passive component and said active components.

3. Playing apparatus as claimed in claim 2 wherein the window comparator means comprises a pair of window comparators.

4. Playing apparatus as claimed in claim 3 having means to generate offset reference voltage ramps and means to generate reference voltages and wherein each window comparator is connected to receive as input two offset reference voltage ramps and one reference voltage and to provide an output signal when the reference voltage is between the two offset ramp voltages.

5. Playing apparatus as claimed in claim 4 in which the means to generate the offset reference voltage ramps comprises a first integrator having a voltage output whose instantaneous value is the electric analog of the horizontal coordinate of the raster scan beam of the television receiver, a second integrator having a voltage whose instantaneous value is the electric analog of the vertical coordinate of the raster scan beam of the television receiver, a first level shifter connected to receive as input thereto an output from the first integrator and to provide as output a first set of offset voltage ramps, and a second level shifter connected to receive as input thereto an output from the second integrator and to provide as output a second set of offset voltage ramps.

6. Playing apparatus as claimed in claim 5 that includes means to synchronize the horizontal voltage ramps and the vertical voltage ramps to horizontal or vertical reference clocks which in turn, control the movement of the raster scan beam of the television receiver.

7. Playing apparatus as claimed in claim 6 wherein the reference clock for the vertical ramp is the incoming power signal and wherein the synchronizing circuit contains means to synchronize to the frequency of the incoming power signal to the apparatus.

8. Playing apparatus as claimed in claim 7 wherein the window comparator means comprises a first type of window comparator to establish position on the image screen of each of the simulated players and for said further active component and a second type of window comparator to establish position of said passive components.

9. Playing apparatus as claimed in claim 2 wherein the window comparator means includes a window comparator connected to receive as input two offset reference voltages and one reference voltage ramp and to provide an output signal when the reference voltage ramp is between the two offset reference voltages, said apparatus further including means to generate the two offset reference voltages and the one reference voltage ramp.

10. Playing apparatus as claimed in claim 1 wherein the electronic controller means is operable to form on the image screen of the television receiver a playing area that is at least three tones of the grey scale of a black and white television receiver.

11. Playing apparatus as claimed in claim 1 wherein the means to disable includes a firing switch that is operated manually.

12. Playing apparatus as claimed in claim 1 wherein the means to disable is a firing switch.

13. Playing apparatus as claimed in claim 1 that includes means to detect the timed coincidence of two objects on the image screen and that further includes combinational logic connected to receive as input an output from the means to detect, said combinational logic serving to change direction of the velocity vector signal representing at least one of the two objects in a manner determined by the particular objects that coincide.

14. Playing apparatus as claimed in claim 13 wherein the electronic controller means includes means operable to retain the two players and the further active component at all times within the playing area.

15. Playing apparatus as claimed in claim 14 wherein the means to retain the two players is means which controls the velocity vectors of the players upon the image screen.

16. Playing apparatus as claimed in claim 14 wherein the electronic controller means includes means which controls the velocity vectors of the active components and wherein the combinational logic is connected to provide a signal to the means which controls the velocity vectors, which signal acts to counteract other separate signals which would drive the players from the play area.

17. Playing apparatus as claimed in claim 1 that includes means to force the disappearance of one of the active components from the screen of the television receiver, dependent on the position of said one of the active components on the image screen and other active and passive components, and to force the said one of the active components to re-appear with different coefficients of its equation of motion dependent upon how it disappeared.

18. Playing apparatus as claimed in claim 1 having means to change relative brightness of simulated players on the screen dependent upon the actual game being played.

19. Playing apparatus as claimed in claim 1 in which two score regions are provided, one at each end of the playing field, and in which the electronic controller means includes means to detect the coincidence between a score region and said object and to attribute a score to one of the two simulated players in the event of such coincidence.

20. Playing apparatus as claimed in claim 19 that includes means to effect disappearance of said object in the event of a score and to cause re-appearance of the object after a fixed time interval at a fixed x spatial coordinate and a random y spatial coordinate in the playing field.

21. Apparatus as claimed in claim 1 that includes player control means connected as input to the electronic controller means and adapted to permit human operators to move the simulated players about the playing area in a fashion that is controlled, in part, by the human operators.

22. Apparatus as claimed in claim 21 in which the player control means comprises a plurality of joy stick and potentiometer combinations, each joy stick and potentiometer combination being connected to control, in part, movement of one simulated player about the playing area, allowable movement of each player being in both the $\pm x$ and the $\pm y$ directions within the playing area.

23. Apparatus as claimed in claim 22 in which the electronic controller means includes window comparator means which establishes the boundaries of both the passive components and the active components and which compares a signal representative of each active component with a set of electric signals representing boundaries of the passive components.

24. Apparatus as claimed in claim 23 herein the controller means produces a first simulated player, a second simulated player and a simulated object upon the image screen, wherein the player controller means comprises a first joy stick and potentiometer combination connected to control, in part, movement of the first simulated player and a second joy stick and potentiometer combination connected to control, in part, movement of the second simulated player.

25. Apparatus as claimed in claim 24 in which each joy stick and potentiometer combination includes two potentiometers, one to provide a signal representative of an x position on the image screen and one to provide a signal representative of a y position on the image screen.

26. Apparatus as claimed in claim 24 that includes first integrator means connected to receive the output of the first joy stick and potentiometer combination representing velocity and second integrator means connected to receive the output of the second joy stick and potentiometer combination representing velocity, each integrator means being adapted to provide an output signal determined by the position or setting of the associated joy stick and potentiometer combination, which output signal serves, in part, to determine the position on the image screen of the particular player controlled, in part, by said associated joy stick and potentiometer combination.

27. Apparatus as claimed in claim 26 that includes limit circuitry connected to detect coincidence of a simulated player with an edge or boundary of the playing area and operable, together with other circuit elements, to effect movement of the simulated player away from said edge or boundary in the event of such coincidence.

28. Apparatus as claimed in claim 27 wherein said other circuit elements include integrator means and window comparator means that interact to provide a combined signal and AND gate means connected to receive the combined signal.

29. Apparatus as claimed in claim 28 that includes first player window comparator means to provide a first player signal that serves to generate one of the simulated players, second player window comparator means to provide a second player signal that serves to generate the second simulated player and object window comparator means to provide an object signal that serves to generate the object.

30. Apparatus as claimed in claim 29 that includes first latch means connected to receive the first player signal and the object signal, and second latch means to receive the second player signal and the object signal and each adapted to note coincidence in time of the two signals received by each, each latch means providing a latch output signal upon the coincidence of a player signal and the object signal and acting to lock the particular simulated player and simulated object together on the image screen, and means to disable the first latch means and the second latch means.

31. Apparatus as claimed in claim 1 wherein said electronic controller means is operable to move the active components about the image screen with two degrees of freedom.

32. Apparatus as claimed in claim 31 that includes player control means connected as input to the electronic controller means and adapted to permit human operators to move the simulated players about the playing area in a fashion that is controlled, in part, by human operators but is, nevertheless, also controlled, in part by the electronic controller means.

33. Apparatus as claimed in claim 32 in which the player control means comprises a plurality of joy stick and potentiometer combinations, each joy stick and potentiometer combination being connected to control, in part, movement of one simulated player about the playing area, allowable movement of each player being in both the $\pm x$ and the $\pm y$ directions within the playing area.

34. Apparatus as claimed in claim 32 in which the player control means comprises a first joy stick and potentiometer combination connected to control, in part, movement of the first simulated player and a second joy stick and potentiometer connected to control, in part, movement of the second simulated player.

35. Apparatus as claimed in claim 1 wherein the means to disable comprises a switch that serves as an electrical bypass around the latch means.

36. Apparatus as claimed in claim 1 wherein the means to disable comprises a momentary switch that can be activated by a human operator to effect momentary deactivation of the latch means.

37. Apparatus as claimed in claim 1 wherein the means to disable comprises circuitry within the latch means that senses coincidence in time of the first player signal and the second player signal and acts to disable the latch means.

38. Apparatus as claimed in claim 47 wherein the means to disable comprises circuitry within the latch means that senses coincidence in time of the player signal of the player to which the object is locked and a signal representing a boundary or an edge of the playing area and upon said coincidence acts to disable the latch means.

39. Apparatus as claimed in claim 1 wherein the means to disable comprises circuitry within the latch means that senses coincidence in time of the first player signal, the second player signal and the object signal and acts to disable the latch means.

40. Apparatus as claimed in claim 47 in which the latch means includes first latch means connected to receive the first player signal and the object signal, and second latch means to receive the second player signal and the object signal and each adapted to note coincidence in time of the two signals received by each, each latch means providing a latch output signal upon the coincidence of a player signal and the object signal and acting to lock the particular simulated player and simulated object together on the image screen, and means to disable the first latch means and the second latch means.

41. Playing apparatus that comprises, in combination: a television receiver that operates within a channel allocated for television broadcasting; at least one player external manual control means having a defined multidirectional coordinate axis; and electronic control means adapted to produce on the image screen of the television receiver the simulation of game components that include at least part of a playing area or other passive component, as well as the simulation of active components that include at least two simulated players under the control of the external manual control means and at least one further active component of a game, said electronic control means comprising means to establish and to control at least one of the coefficients of velocity and acceleration of said two simulated players independent of the external manual control means and said further active component by virtue of the position of the particular active component on the coordinate axis, said electronic control means being aware of all the coefficients of all the parameters of said game components including the coefficients of position and velocity, said control means further including latch means connected to receive the first player signal, the second player signal and the object signal and adapted to note coincidence in time of any two signals, said latch means providing a latch output signal upon the coincidence of a player signal and the object signal, that acts to lock the particular simulated player and simulated object together on the image screen, and means to disable said latch means.

42. Apparatus as claimed in claim 41 wherein the means to disable comprises a switch that serves as an electrical bypass around the latch means.

43. Apparatus as claimed in claim 41 wherein the means to disable comprises a momentary switch that can be actuated by a human operater to effect momentary deactivation of the latch means.

44. Apparatus as claimed in claim 41 wherein the means to disable comprises circuitry within the latch means that senses coincidence in time of the first player signal and the second player signal and acts to disable the latch means.

45. Apparatus as claimed in claim 41 wherein the means to disable comprises circuitry within the latch means that senses coincidence in time of the player signal of the player to which the object is locked and a signal representing a boundary or an edge of the playing field and upon said coincidence acts to disable the latch means.

46. Apparatus as claimed in claim 41 wherein the means to disable comprises circuitry within the latch means that senses coincidence in time of the first player signal, the second player signal and the object signal and acts to disable the latch means.

47. For use in an electronic game wherein simulated images are produced on the image screen of a CRT having a raster scan beam, electronic controller means operable to produce on said image screen the simulation of a playing area or region of the game and the simulation of a plurality of active components that assume adversary positions relative to one another, and an object that moves about the playing area or region, said electronic controller means including, in combination, first component signal generating means to provide a first active component signal that serves to generate on the image screen one of the simulated active components, at least one further component signal generating means to generate a further active component signal that serves to generate on the image screen a further active component, object generating means that serves to generate said object on the image screen, and latch means connected to receive the first active component signal, the further component signal and the object signal and adapted to note the coincidence of an active component signal and the object signal and, when activated, to lock the particular simulated component and the simulated object together on the image screen, and means to activate the latch means.

48. Apparatus as claimed in claim 47 that includes means to disable said latch means.

49. For use in an electronic game wherein simulated images are produced on the image screen of a CRT having a raster scan beam, electronic controller means operable to produce on said image screen the simulation of a playing area or region of the game, the simulation of at least one active component of said game, and the simulation of an object that moves about the playing area or region, said electronic controller means including, in combination, component signal generating means to provide an active component signal that serves to generate on the image screen the simulated active component, object generating means that serves to generate said object on the image screen, latch means connected to receive the active component signal and the object signal and adapted to note the coincidence of the active component signal and the object signal and, when activated, to lock the simulated component and the simulated object together on the image screen, and means to activate the latch means.

* * * * *